March 19, 1957
B. B. McHAN
2,786,012
COMPOSITIONS AND METHOD OF PRODUCING A CALCIUM
CARBONATE CARRIER FOR INSECTICIDES
Filed Jan. 28, 1954
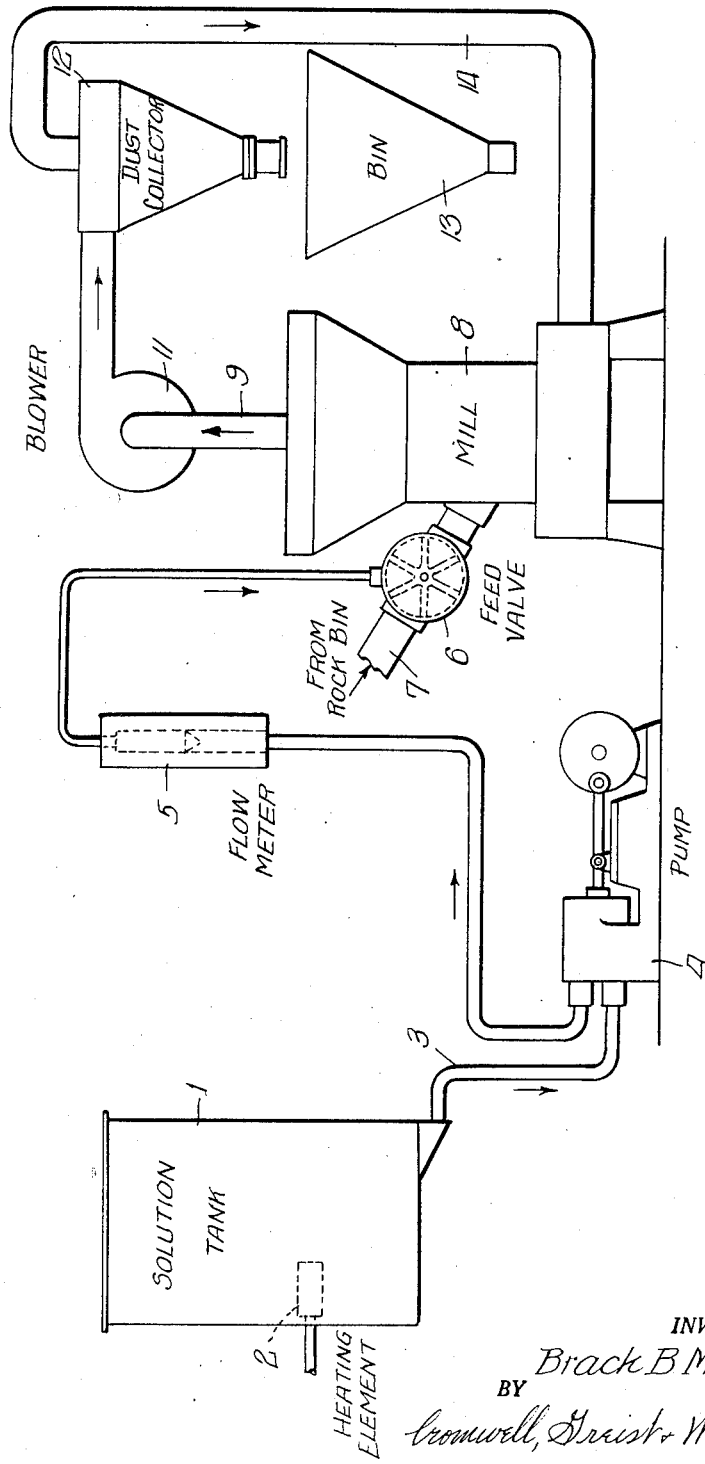
INVENTOR.
*Brack B McHan,*
BY
*Cromwell, Greist & Warden*
*Attys*

United States Patent Office 2,786,012
Patented Mar. 19, 1957

2,786,012

COMPOSITIONS AND METHOD OF PRODUCING A CALCIUM CARBONATE CARRIER FOR INSECTICIDES

Brack B. McHan, Quincy, Ill., assignor to Calcium Carbonate Company, Chicago, Ill., a corporation of Illinois Application January 28, 1954, Serial No. 406,675

16 Claims. (Cl. 167—42)

This invention relates, generally, to improvements and innovations in insecticides and it has particular relation to the use as a diluent and carrier in insecticidal dust compositions of hydrophobic, fully dispersed, non-lumping and non-caking, finely pulverized limestone of low redox potential.

A pulverized limestone or calcium carbonate diluent and carrier suitable for use in accordance with the present invention is disclosed in my copending application Serial No. 52,755, filed October 4, 1948, and now Patent No. 2,668,749. The present application is a continuation-in-part of said copending application Serial No. 52,755, which latter application was a continuation-in-part of my prior application Serial No. 418,618, filed on November 10, 1941, now abandoned, which latter application was in turn a continuation-in-part of my prior application Serial No. 199,983, filed on April 4, 1938, now abandoned, and which latter application was in turn a continuation-in-part of my earlier application Serial No. 44,997, filed October 14, 1935, now abandoned.

The pulverized limestone or calcium carbonate produced in accordance with the particular methods disclosed in my said copending and prior applications is distinctive and different in kind from ordinary pulverized limestone or calcium carbonate. Pulverized limestone or calcium carbonate produced in accordance with my prior invention is unwettable by water, non-oxidizing, free-flowing and free-dusting and relatively non-alkaline in effect, whereas ordinary pulverized calcium carbonate or limestone is easily wetted with water, oxidizes oxygen-sensitive materials, tends to compact and ball together so as not to be free-dusting or free-flowing, and is definitely alkaline. My copending and prior applications disclosed and claimed the use of my distinctive pulverized limestone product as a carrier of insecticides, generally, and of sulfur dust specifically. It was pointed out in these earlier applications that the dispersed condition and the water-repellent characteristics of my particular pulverized limestone product rendered it especially suitable for use as a carrier for an insecticide. Its dispersivity insures an adequate distribution of the insecticide throughout the desired area and apparently creates an electro-chemical attraction to the foliage or leaf structure since the insecticide forms a more or less tightly adhered and continuous layer on the leaves and foliage and has to a remarkable degree the property of "spreading." The insecticide carrier adheres to the leaf structure and foliage tenaciously notwithstanding heavy dews and even protracted periods of rain.

It was pointed out in my copending and prior applications that when my particular pulverized limestone or calcium carbonate is used in an insecticide as a carrier, the carrier is not only itself in a highly dispersed state, but it also serves as a dispersing reagent for the other ingredients of the insecticide which tend to be highly aggregated. It was pointed out that such highly aggregated ingredients are frequently present in insecticides.

The discovery of DDT as an insecticide during World War II resulted in the stimulation of further development and the discovery of a number of other new commercial organic insecticides and pesticides. These organic compounds have to a large extent replaced the old calcium arsenate and lime dusts. At the present time, dusts and insecticide compositions made with the recently developed synthetic organic pesticides are used for insect and pest control on practically all types of field, orchard and garden crops. Compounding of the modern organic, synthetic insecticides has introduced many problems in the production of dusts. In particular, it has been difficult to produce dusts having adequate free-flowing, free-dusting characteristics which are non-caking on standing in normal storage.

Many of the new organic insecticides are difficult to introduce into a carrier by grinding or other means in a manner which results in uniform and accurate inclusion of the toxic material in the carrier. Several of the organic insecticides have viscous and sticky properties that cause them to suppress the free-flowing characteristics of the dust formulas. Also, practically all of these organic insecticides have the very undesirable property of aggregating and compacting the blended insecticide during storage. Such compaction on storage results in caked, lumpy and poor dusting products which are difficult to discharge from the dusting machines. In airplane dusting this caked and lumpy condition is extremely hazardous. It is not an uncommon occurrence for the producer of the insecticide or dust to regrind and reblend finished products that have been standing in storage for some time before they can be merchandised.

In addition to these difficulties, many of the modern organic, synthetic insecticides are reported to be unstable in a carrier having a pH above about 7 to 7.5. This is due to the ease with which the labile chlorine atom or phosphorous atom is hydrolyzed in contact with a carrier having a pH above about 7.5. The insecticides which are considered unstable in a carrier having a pH above about 7.5 include: BHC (a mixture of optical isomers of benzene hexachloride, the killing power being proportional to the gamma isomer content which is about 10 to 13%); DDT (2,2-bis [p-chlorophenyl]-1,1,1-trichloroethane); Heptachlor (4,5,6,7,8,8, heptachloro - 3a,4,7,7a-tetratrydro-4,7-methanoindene); EPN (ethyl p-nitrophenyl thionobenzene phosphonate); Toxaphene (chlorinated camphene-$C_{10}H_{10}Cl_8$); Parathion (o-o-diethyl-o-p-nitrophenyl thiophosphate); Methoxychlor (2,2-bis-[p-methoxyphenyl] 1,1,1 - trichloroethane); Chlordane (2,3,4,5,6,7,8,8-octachloro-2,3,3a,4,7,7a-hexahydro-4,7-methanoindene); Aldrin (1,2,3,4,10,10-hexachloro-1:4,5:8 - diendomethane - 1,4,4a5,8,8a - hexahydronaphthalene); Dieldrin (1,2,3,4,10,10 - hexachloro - 6,7 - epoxy-1:4,5:8 diendomethano-1,4,4a,5,6,7,8,8a-octahydro naphthalene) and Aramite (2-[p-tert-butyl-phenoxy] methylethyl 2-chloroethyl sulfite).

The discovery and commercial development of these organic, synthetic insecticides which require an inert diluent or carrier has greatly stimulated the production of specially ground rock and earth products and their adaptation as dust carriers to meet the problems of dust formulations mentioned above. In general, the dust carriers that have been developed are of two types, i. e. (1) absorbent and (2) non-absorbent. The adsorbent dusts are usually produced from diatomaceous earth, fuller's earth, and several varieties of clay. The non-absorbent dusts have been produced from certain clays, pyrophyllite and talc. There are other similar materials used in the production of dust, but the varieties just named constitute by far the major percentage of all diluents and carriers used heretofore. All of these products have a pH around 7.5 or slightly under. They also have rather low bulk density, usually varying from 15 to 30 pounds per cubic foot in the loose condition. Dust formulas produced from these absorbent and non-absorbent diluents do not have good or entirely satisfactory dusting properties. They are aggregated, inclined to lump and cake, and do not flow freely and easily from a discharge nozzle of the dusting machine. They also cake and compact on storage, particularly when blended with a sticky or waxy insecticide.

Several unsuccessful attempts have been made to introduce ordinary ground limestone as a carrier and diluent for these modern organic, synthetic insecticides. These attempts have not been successful for several reasons. Thus, ordinary ground limestone is hydrophilic (easily wetted with water), has a marked tendency to compact, cake and aggregate and is not free-flowing or free-dusting. All of these properties are unsuitable in a carrier or diluent for insecticide dusts and therefore ordinary ground limestone does not improve or enhance dusting properties, prevent lumping and caking, but actually is detrimental in these respects. Furthermore, ordinary ground limestone as a carrier or diluent does not contribute to or give good "coverage" properties. In addition, there is a general assumption by insecticide formulators that many of the modern synthetic organic insecticides will not be stable or retain their toxic properties when mixed with an alkaline carrier or diluent such as ground limestone.

In addition, the high density of ordinary ground limestone, which runs from 40 to 60 pounds per cubic foot depending upon the fineness of the grind, is considered objectionable. However, it would be a very desirable accomplishment if ground limestone could be used as a carrier and diluent for these synthetic insecticides and it would be a very valuable contribution to the economics of dust formulation and production for insect and pest control.

Extensive tests, including full scale tests, have shown that the special pulverized calcium carbonate or limestone made in accordance with my prior invention as disclosed in the above identified copending and prior applications is an excellent carrier and diluent for insecticide dusts made with these modern organic, synthetic insecticides. Not only is my pulverized limestone a satisfactory substitute for other carriers and diluents which have been used, but it is superior in one or more respects and offers a number of significant advantages. The more important of these advantages contributed by and peculiar to the pulverized limestone produced in accordance with my prior invention may be summarized as follows:

(1) Improved stability of product.

(2) Contributes to the grinding and mixing process in the formulation of dust so as to eliminate caking in the mixers and produce insecticide formulations which contain a more uniform percentage of the toxic component.

(3) Insecticides are fully dispersed, non-aggregating, and free-dusting thereby forming effective and heavy dust clouds which give excellent plant coverage.

(4) The electrical charge on the dust particles causes the dust to be attracted to the plant foliage, and as a result, plants subjected to a cloud of this dust become uniformly coated on all portions with a thin layer of dust, carrying the toxic ingredients uniformly to all portions of the plant.

(5) Dusts formulated with this particular pulverized calcium carbonate or limestone, even though used in a minor percentage, are very effectively conditioned against caking, lumping and packing on long and continued storage. This insures that the dusts produced by the manufacturer may be stored under normal conditions and may be taken from the storeroom at any time with the assurance that the product will be in good condition for use.

The foregoing and certain other advantages of the present invention will be described and developed more fully hereinafter.

While my particular type of pulverized limestone or calcium carbonate may be used as the sole diluent or inert carrier for an insecticidal composition containing only a single toxic ingredient, for many commercial purposes it will be desirable to have a formulation which not only contains a plurality of active insecticide ingredients but also a plurality of inert diluents or carriers. In many instances, my particular pulverized limestone will be used to form between 20 to 80% of the diluent of the insecticide compositions. As little as 7% may be used to advantage when the insecticide is dusting sulfur especially, where the surface of the pulverized limestone is used as a carrier for an excess of a substance containing a higher fatty acid radical as mentioned below.

My above-mentioned copending application and prior applications disclose that pulverized limestone may be rendered hydrophobic, fully dispersed, free-flowing, non-compacting and non-caking by addition according to my method of from 0.025 to 0.3% by weight of a substance containing a higher fatty acid radical having from 10 to 22 carbon atoms per molecule. The resulting pulverized limestone is entirely satisfactory as a diluent or inert carrier for many insecticidal dust formulations according to this invention, especially when the fully dispersed pulverized limestone constitutes a fairly large proportion of the insecticide formulation, e. g. 20% or more. However, there are certain insecticide formulations, as will be mentioned below, wherein there is room for only a small percent of carrier or diluent. In these formulations improved results may be obtained by increased the percent of the fatty acid radical containing substance well above the 0.3% which is required to render it fully dispersed and have the other properties mentioned above. Thus, the percent of the fatty acid radical containing substance may be increased up to 10% by weight so that the pulverized limestone in effect serves as a carrier for an extra amount of the fatty acid radical containing substance. This extra percent of fatty acid radical containing substance increases the effectiveness of the fully dispersed pulverized limestone in insecticidal dusts when the limestone is present in a small percent, e. g. less than 20%.

An object of the invention is the satisfactory use in an insecticidal dust formulation of a substantial portion of pulverized limestone or calcium carbonate as a diluent and carrier, and this object may be achieved by the use of a special pulverized calcium carbonate or limestone corresponding in properties to that obtained by the method disclosed in my aforesaid copending and prior applications.

An important and more specific object of the invention is the use of my special pulverized limestone or calcium carbonate in conjunction with organic, synthetic insecticides in the formulation of insecticidal dusts.

An important object of the invention is the provision of insecticide compositions containing various commercial insecticides either singly or in combination and also a substantial percentage of pulverized limestone or calcium carbonate which is incorporated in the composition as a grinding aid during the preparation thereof and which renders the resulting composition stable, free-flowing and non-caking, free-dusting, fully dispersed, non-aggregating, non-compacting or caking on long storage, resistant to removal by rain and heavy dews, and having a marked affinity to adhere to foliage for long periods.

A further object of the invention is the use in insecticidal compositions containing commercial insecticides including the organic, synthetic insecticides of a substantial percentage of pulverized calcium carbonate or limestone which is hydrophobic, fully dispersed, electrostatically negative, non-lumping and non-caking, and having a low redox potential.

A further object of the invention is the use in insecticidal dust compositions containing large proportions of insecticidal ingredients and relatively small but substantial proportions of carrier or diluent, of pulverized limestone which contains an excess of fatty acid radical containing substance over and above that necessary to render the pulverized limestone hydrophobic, fully dispersed, non-lumping and non-caking and having a low redox potential.

Another object of the invention is an improved method of compounding or formulating insecticidal dusts with organic, synthetic insecticides as the active ingredients which comprises using a substantial percentage of finely pulverized limestone which is hydrophobic, fully dispersed, non-lumping and non-caking, of low redox potential, and which corresponds to the finely divided pulverized limestone or calcium carbonate described in my aforesaid copending application.

Certain other objects of the invention will, in part, be obvious and will, in part, appear hereinafter.

For a more complete understanding of the nature and scope of the invention, reference may now be had to the following detailed description thereof taken in connection with the accompanying drawing which is a diagram of a schematic arrangement for processing limestone rock to produce the type of pulverized limestone or calcium carbonate which is useful for this invention.

As stated above, the present invention involves the use of a particular type of pulverized or ground calcium carbonate or limestone having properties which correspond to those possessed by pulverized limestone or calcium carbonate prepared in accordance with the disclosure of my copending application Serial No. 52,755 and the above mentioned prior applications. At the present time I am unaware of any other equally satisfactory method of preparing the same or a similar pulverized limestone product. However, if such a method exists or is developed and the resulting product corresponds to my particular pulverized limestone product, then that product would also be useful in the present invention and it is intended that such use would be covered by the claims of this present application.

My particular method of preparing pulverized calcium carbonate or limestone which is useful for the purposes of this invention may be briefly described as follows:

In general, my invention embraces the idea of treating calcium carbonate with a higher fatty acid, either saturated or unsaturated, which contains from 10 to 22 carbon atoms or derivatives thereof. More specifically, the calcium carbonate in a dry state has added to it a small percent (usually less than 0.3% by weight) of a higher fatty acid as, for example, capric, abietic, lauric, stearic, oleic, erucic and perilla oil, tall oil, or linseed oil fatty acids or alkali metal salts thereof such as sodium or potassium oleate, or stearate. The calcium carbonate is then ground dry to a pulverized condition.

In the drawing it will be noted that a solution tank 1 is provided, preferably heated by an element 2 to maintain the solution liquefied in all weathers. In carrying out the process, any saturated or unsaturated higher fatty acid having from 10 to 22 carbon atoms may be employed, but in view of the economy both financially and as to time of reaction, it is preferred to use oleic or stearic acid or an alkali metal salt of these acids, especially sodium oleate. In this connection, it has been found that sodium oleate is especially desirable because of its ease in handling and uniformity of distribution in the calcium carbonate. In describing the invention the preferred embodiment comprising oleic acid and sodium oleate will be hereinafter mentioned, it being understood, however, that other saturated or unsaturated higher fatty acids having from 10 to 22 carbon atoms or their derivatives may be substituted for oleic acid and sodium oleate.

A suitable solution of sodium oleate may be prepared by saponifying oleic acid with a slight excess of sodium hydroxide to give a resultant solution alkaline in nature and containing approximately 15% sodium oleate. For instance, approximately 10¼ pounds of oleic acid may be placed in substantially 40 pounds of water, and this solution permitted to react with the solution of sodium hydroxide formed by dissolving approximately 1 pound 12¾ ounces of sodium hydroxide in 7½ pounds of water, the mixture being boiled until saponification of the oleic acid is complete.

Emulsions of fatty acids or fatty acid glycerides may be used satisfactorily. For example, water emulsions of distilled rosin acid have been satisfactorily used in the solution tank 1. Rosin acid contains a mixture of fatty acids including a considerable amount of oleic acid and in addition such acids as abietic acid. Triethanolamine may be used as an emulsifying agent in such a composition. These emulsions have the advantage of not setting up in cold weather.

The reagent from tank 1 is passed through a line 3 in which is interposed a pump 4 and flow meter 5, to a feed valve 6. The feed valve 6 is located in the conduit 7, which carries the crushed rock from the rock bin to the mill 8.

Mill 8 is preferably a ring roll or hammer mill suitable for receiving relatively coarsely crushed limestone and discharging finely ground material at a high rate of production such as, for example, 5 to 7 tons per hour. Ordinarily the limestone is subjected to the action of the grinding apparatus for only a short time, not over about one to three minutes and in some instances considerably less than a minute. This short grinding period is sufficient for uniform distribution of the sodium oleate on the limestone and to produce the desired particle size. Excessive fines are to be avoided because of the increased dust losses resulting therefrom.

The pulverized rock is withdrawn through the pipe 9 by means of a blower 11 and passes to a dust collector 12. The dust is collected by the collector 12, and the pulverized material passes to a bin 13, while the air is returned to the mill through pipe 14.

In certain instances improved results are obtained when the reagent is introduced directly into the mill 8 and not passed through the feeder 6.

The following table gives the particle size distribution of two fully dispersed pulverized limestone products made according to my process, one product (i. e. #4 grade) being an example of a relatively coarse grade, and the other product (i. e. #2 grade) being an example of a relatively fine grade:

| Micron Size | #4 Grade, Percent | #2 Grade, Percent |
| --- | --- | --- |
| +25 | 49.8 | 19.5 |
| 10-25 | 21.2 | 35.0 |
| 5-10 | 13.0 | 21.3 |
| 1-5 | 13.8 | 21.6 |
| −1 | 2.2 | 2.73 |

As set forth in my Patent No. 2,668,749, a typical pulverized limestone product made in accordance with my process is formed from treated particles the sizes of substantially all of which range from 1 to 100 microns in diameter.

While the amount of sodium oleate, oleic acid, or other fatty acid radical containing substance, fed to the rock may be varied within a certain range, it has been found that a ratio of the reagent to limestone of from 0.025% to 0.3% is sufficient except where the limestone is used in a relatively small proportion and is loaded with an excess of the fatty acid substance as explained above. This excess is added in the same way that the usual amount of 0.025 to 0.3% of fatty acid substance is added.

When capric, stearic, abietic, lauric, and perilla oil, tall oil, or linseed oil fatty acids or their derivatives are employed in amounts up to 0.3% by weight of the limestone, substantially the same degree of dispersion was obtained as when oleic acid or sodium oleate was used. In the case of erucic acid or salts of erucic acid, the pulverized product obtained was not as highly dispersed as in the case of the other higher fatty acids or derivatives thereof.

Other saturated or unsaturated higher fatty acids having between 10 to 22 carbon atoms which have not been specifically disclosed herein are also applicable in the process of this invention. However, the higher fatty acids and higher fatty acid radical containing substances disclosed herein comprise a number of those readily available on the market at a price reasonable enough to warrant their use in the process of this invention economically.

While the procedure and apparatus described above in connection with the drawing constitute a preferred method of and means for producing pulverized calcium carbonate or limestone having the desired properties for use in the present invention, this product may be made in other forms of apparatus. For example, the process may be carried out in a ball mill if provision is made for immediate removal of the pulverized product as it is formed, from the grinding or pulverizing zone.

The following specific examples will serve to teach and disclose useful embodiments of my invention and will be illustrative and suggestive to those skilled in the art of additional formulations which may be made in accordance with the invention. As a matter of convenience, the term "fully dispersed pulverized limestone" will be used in these examples and hereinafter to designate the ground limestone or calcium carbonate which has been described above and which forms the subject matter of my copending application Serial No. 52,755 and the earlier applications referred to therein.

*Example 1*

| | Percent by weight |
|---|---|
| Dusting sulfur | 93 |
| Pulverized limestone containing approximately 10% of stearic acid | 7 |

*Example 2*

| | Pounds |
|---|---|
| BHC (12.5% gamma isomer) | 495 |
| DDT | 205 |
| Fuller's earth | 90 |
| Sulfur | 800 |
| Pulverized limestone containing approximately 10% stearic acid | 310 |

The BHC, DDT and fuller's earth are first ground or impregnated together and then blended with the sulfur and the pulverized limestone.

It will be noted that in Examples 1 and 2 the pulverized limestone is present in relatively small percentages, i. e. 7% and 10%, respectively, and is used in the form loaded with an axcess of the fatty acid substance. Apparently this fatty acid substance is present as the calcium salt and during mixing with the other insecticide ingredients a portion of the excess becomes transferred thereto.

*Example 3*

| | Pounds |
|---|---|
| BHC (12.5% gamma isomer) | 495 |
| DDT | 205 |
| Fuller's earth | 90 |
| Fully dispersed pulverized limestone containing approximately 0.3% fatty acid substance | 1110 |

The BHC, DDT and fuller's earth are ground or impregnated together and then blended with the fully dispersed pulverized limestone.

*Example 4*

(This example brings out the unique properties of my fully dispersed pulverized limestone as a grinding aid.)

| | Pounds |
|---|---|
| BHC (12.5% gamma isomer) | 600 |
| DDT | 125 |
| Fuller's earth | 615 |

This formulation was blended and ground in a Raymond Imp mill. Because of caking and compacting, it was necessary to shut the mill down at intervals of one to two hours and dig out the mill. Usually it took about an hour to clean out the mill each time. Therefore, the mill was shut down about 35% of the time.

The formula was changed so as to replace part of the carrier with my fully dispersed pulverized limestone as follows:

| | Pounds |
|---|---|
| BHC (12.5% gamma isomer) | 600 |
| DDT | 125 |
| Fuller's earth | 308 |
| Fully dispersed pulverized limestone containing approximately 0.3% fatty acid substance | 307 |

This grind did not require mill cleaning for over eight hours and there was no loss of grinding time during the eight-hour shift. As a result, the production of the mill was increased by over a third and the labor required for cleaning was eliminated.

*Example 5*

| | Percent by weight |
|---|---|
| BHC (12.5% gamma isomer) | 25 |
| Fuller's earth | 25 |
| Fully dispersed pulverized limestone containing approximately 0.3% fatty acid substance | 50 |

*Example 6*

| | Percent by weight |
|---|---|
| Toxaphene | 20 |
| Fuller's earth (absorbent dust) | 20 |
| Fully dispersed pulverized limestone containing approximately 0.3% fatty acid substance | 60 |

*Example 7*

| | Percent by weight |
|---|---|
| Aramite | 1–1.5 |
| Fully dispersed pulverized limestone containing approximately 0.3% fatty acid substance | 95.5–99 |

*Example 8*

| | Percent by weight |
|---|---|
| Parathion | 1 |
| Fully dispersed pulverized limestone containing approximately 0.3% fatty acid substance | 99 |

In addition to the foregoing examples, formulations may be prepared with my fully dispersed pulverized limestone containing Heptachlor, EPN, Methoxychlor, Chlordane, Aldrin and Dieldrin. In all instances the limestone produced the advantages referred to above.

Shelf-life tests have been carried out to determine the stabilities of various insecticidal dust compositions wherein my fully dispersed pulverized limestone constituted up to 100% of the diluent and carrier. These tests extended as long as 66 weeks and showed that the various formulations had good to excellent toxic stability. In addition, the formulations were non-caking, non-compacting, free-dusting and free-flowing at the ends of the various tests.

Field tests have been conducted on insecticidal dusts formulated with my fully dispersed pulverized limestone as all or a substantial percentage of the carrier or diluent. These field tests showed that such formulations gave better dusting performance, better coverage, and better insect control than prior dust formulations.

Based on the numerous formulations which have been made and tested, it appears that my above described fully dispersed pulverized limestone is suitable for use as a carrier or diluent and as a grinding aid for and in insecticidal dusts generally.

What is claimed as new is:

1. An insecticide comprising a carrier and an insecticidal value carried thereby, said carrier being calcium carbonate to which there has been added and ground therewith less than 0.3% by weight of a substance containing the oleic acid radical.

2. An insecticide comprising a carrier or diluent and an insecticidal value carried thereby, said carrier being calcium carbonate to which there has been added and ground therewith not more than about 0.3% by weight of a substance containing a higher fatty acid radical having from 10 to 22 carbon atoms per molecule.

3. An insecticide dust composition containing as a carrier or diluent a substantial proportion of limestone to which there has been added and ground therewith a small percent by weight of a substance containing a higher fatty acid radical having from 10 to 22 carbon atoms per molecule.

4. An insecticide dust composition containing at least about 20% by weight of hydrophobic, fully dispersed, free-flowing, non-aggregating, pulverized limestone as an insecticide carrier with the surfaces of the limestone particles being uniformly treated with approximately 0.025 to 0.3% by weight of a substance containing a higher fatty acid radical having from 10 to 22 carbon atoms per molecule.

5. An insecticide dust composition containing as a carrier or diluent less than 20% by weight of pulverized limestone the surfaces of the particles of which have been uniformly treated with up to 10% by weight of a substance containing a fatty acid radical having from 10 to 22 carbon atoms per molecule.

6. An insecticide dust composition containing at least about 40% by weight of sulfur and as a carrier or diluent less than 20% by weight of pulverized limestone the surfaces of the particles of which have been uniformly treated with up to 10% by weight of a substance containing a fatty acid radical having from 10 to 22 carbon atoms per molecule.

7. An insecticide dust containing o-o-diethyl-o-p-nitrophenyl thiophosphate and as a diluent or inert carrier therefor a substantial percentage of limestone to which there has been added and ground therewith from 0.025 to 0.3% based on the weight of the limestone rock of a substance containing a higher fatty acid radical having from 10 to 22 carbon atoms per molecule.

8. An insecticide dust containing chlorinated camphene and as a diluent or inert carrier therefor a substantial percentage of limestone to which there has been added and ground therewith from 0.025 to 0.3% based on the weight of the limestone rock of a substance containing a higher fatty acid radical having from 10 to 22 carbon atoms per molecule.

9. An insecticide dust containing 2-(p-tert-butylphenoxy) methylethyl 2-chloroethyl sulfite and as a diluent or inert carrier therefor a substantial percentage of limestone to which there has been added and ground therewith from 0.025 to 0.3% based on the weight of the limestone rock of a substance containing a higher fatty acid radical having from 10 to 22 carbon atoms per molecule.

10. An insecticide containing approximately 20% by weight of chlorinated camphene, approximately 20% of absorbent dust and approximately 60% of limestone to which there has been added and ground therewith from 0.025 to 0.3% based on the weight of the limestone rock of a substance containing a higher fatty acid radical having from 10 to 22 carbon atoms per molecule.

11. An insecticide containing approximately 1 to 1.5% by weight of 2-(p-tert-butyl-phenoxy) methylethyl 2-chloroethyl sulfite and approximately 98.5 to 99% of limestone to which there has been added and ground therewith from 0.025 to 0.3% based on the weight of the limestone rock of a substance containing a higher fatty acid radical having from 10 to 22 carbon atoms per molecule.

12. An insecticide containing about 1% by weight of o-o-diethyl-o-p-nitrophenyl thiophosphate and approximately 99% of limestone to which there has been added and ground therewith from 0.025 to 0.3% based on the weight of the limestone rock of a substance containing a higher fatty acid radical having from 10 to 22 carbon atoms per molecule.

13. The improvement in the manufacture of insecticide dusts which comprises the step of grinding the ingredients of an insecticide formulation in the presence of a substantial percentage of limestone to which there has been added and ground therewith from 0.025 to 0.3% based on the weight of the limestone rock of a substance containing a higher fatty acid radical having from 10 to 22 carbon atoms per molecule.

14. An insecticide comprising a carrier and an insecticidal value carried thereby, said carrier being calcium carbonate to which there has been added and ground therewith a small percent by weight of a substance containing a higher fatty acid radical, the sizes of substantially all of the carrier particles ranging from 1 to 100 microns in diameter.

15. An insecticide dust composition containing as a carrier or diluent a substantial proportion of limestone to which there has been added and ground therewith a small percent by weight of a substance containing a higher fatty acid radical having from 10 to 22 carbon atoms per molecule, the sizes of substantially all of the carrier particles ranging from 1 to 100 microns in diameter.

16. The improvement in the manufacture of insecticide dusts which comprises the step of grinding the ingredients of an insecticide formulation in the presence of a substantial percentage of limestone to which there has been added and ground therewith a small percent by weight of a substance containing a higher fatty acid radical having from 10 to 22 carbon atoms per molecule, the sizes of substantially all of the limestone particles ranging from 1 to 100 microns in diameter.

References Cited in the file of this patent
UNITED STATES PATENTS

| | | |
|---|---|---|
| Re. 22,700 | Muller | Dec. 4, 1945 |
| 1,847,540 | Sanders | Mar. 1, 1932 |
| 2,034,797 | Church | Mar. 24, 1936 |
| 2,523,420 | Burrage | Sept. 26, 1950 |

OTHER REFERENCES

Bourcart: Insecticides, Fungicides, and Weed Killers, 2nd. ed. (1925), page 397.